(12) United States Patent
Sawyers-Abbott et al.

(10) Patent No.: US 11,230,975 B2
(45) Date of Patent: Jan. 25, 2022

(54) MODULATED FIRE EXTINGUISHING VENT FOR A GAS TURBINE ENGINE

(71) Applicant: United Technologies Corporation, Farmington, CT (US)

(72) Inventors: Nigel David Sawyers-Abbott, South Glastonbury, CT (US); Federico Papa, Ellington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 232 days.

(21) Appl. No.: 16/358,760

(22) Filed: Mar. 20, 2019

(65) Prior Publication Data
US 2020/0300171 A1 Sep. 24, 2020

(51) Int. Cl.
*F02C 7/25* (2006.01)
*A62C 3/08* (2006.01)
*F02C 9/18* (2006.01)
*F02C 9/34* (2006.01)
*F02K 3/04* (2006.01)
*B64D 45/00* (2006.01)

(52) U.S. Cl.
CPC ............... *F02C 7/25* (2013.01); *A62C 3/08* (2013.01); *F02C 9/18* (2013.01); *F02C 9/34* (2013.01); *F02K 3/04* (2013.01); *B64D 2045/009* (2013.01)

(58) Field of Classification Search
None
See application file for complete search history.

(56) References Cited

U.S. PATENT DOCUMENTS

| 3,990,530 A | * | 11/1976 | Helfrich | B64D 33/06 |
| | | | | 181/215 |
| 5,239,817 A | * | 8/1993 | Mildenstein | F02C 7/25 |
| | | | | 244/129.2 |
| 5,351,476 A | * | 10/1994 | Laborie | F02C 7/12 |
| | | | | 60/785 |
| 10,305,040 B2 | * | 5/2019 | Stoessel | H01L 51/005 |
| 2011/0120075 A1 | * | 5/2011 | Diaz | F02K 1/383 |
| | | | | 60/39.11 |
| 2012/0103638 A1 | | 5/2012 | Mickelsen et al. | |
| 2012/0168115 A1 | * | 7/2012 | Raimarckers | F01D 25/08 |
| | | | | 165/41 |

(Continued)

FOREIGN PATENT DOCUMENTS

CN 104941090 9/2015

OTHER PUBLICATIONS

European Search Report for Application No. 20163924.2 dated Aug. 5, 2020.

*Primary Examiner* — Todd E Manahan
*Assistant Examiner* — Rodolphe Andre Chabreyrie
(74) *Attorney, Agent, or Firm* — Carlson, Gaskey & Olds, P.C.

(57) ABSTRACT

A gas turbine engine includes an engine core having a compressor, a combustor fluidly connected to the compressor, and a turbine fluidly connected to the combustor. A core nacelle is disposed radially outward of the engine core. A cavity is disposed between an inner surface of the core nacelle and an outer surface of the engine core. The cavity includes a vent disposed at an aft end. The vent includes at least one flap configured to be maintained in an unrestricted position and in a restricted position. An actuator is configured to control the position of the at least one flap.

14 Claims, 3 Drawing Sheets

(56) References Cited

U.S. PATENT DOCUMENTS

| | | |
|---|---|---|
| 2016/0368618 A1 | 12/2016 | Charlemagne et al. |
| 2017/0184025 A1 | 6/2017 | Sawyers-Abbott |
| 2017/0184030 A1 | 6/2017 | Brousseau et al. |
| 2018/0163361 A1 | 6/2018 | Takeuchi |
| 2020/0095879 A1* | 3/2020 | De Pau, Jr. ............ F16J 15/027 |
| 2020/0240361 A1* | 7/2020 | Schacht .................. F02K 3/06 |

* cited by examiner

MODULATED FIRE EXTINGUISHING VENT FOR A GAS TURBINE ENGINE

TECHNICAL FIELD

The present disclosure relates generally to fire suppression systems for a gas turbine engine, and more specifically to a modulated fire extinguishing vent within the same.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine as well.

Due to the potential for onboard fires, gas turbine engines include fire suppression systems. One exemplary fire suppression system included in some engines uses a gaseous fire suppressant to flood a compartment when a fire is detected. The fire suppressant is non-flammable gas, such as a noble gas. Increasing the amount of non-flammable suppressant in the compartment, decreases the concentration of oxygen within the compartment. By reducing the percentage of oxygen in the environment to prevent flammable fluid vapors igniting, the fire is extinguished.

SUMMARY OF THE INVENTION

In one exemplary embodiment a gas turbine engine includes an engine core including a compressor, a combustor fluidly connected to the compressor, and a turbine fluidly connected to the combustor, the engine core defining an axis, a core nacelle disposed radially outward of the engine core, a cavity disposed between an inner surface of the core nacelle and an outer surface of the engine core, the cavity including a vent disposed at an aft end, wherein the vent includes at least one flap configured to be maintained in an unrestricted positon and in a restricted position, and an actuator configured to control the position of the at least one flap.

In another example of the above described gas turbine engine the flap is a normally unrestricted flap.

Another example of any of the above described gas turbine engines further includes a controller configured to apply power to the actuator in response to a fire suppression action.

In another example of any of the above described gas turbine engines the flap is a normally restricted flap.

Another example of any of the above described gas turbine engines further includes a controller configured to mechanically disconnect the actuator from a power supply to the at least one flap in response to a fire suppression action.

Another example of any of the above described gas turbine engines further includes a controller configured to remove power from the actuator in response to a fire suppression action.

In another example of any of the above described gas turbine engines the flap is pivoted radially inward in the restricted position, relative to the unrestricted position.

In another example of any of the above described gas turbine engines the flap is pivoted radially outward in the restricted position, relative to the unrestricted position.

In another example of any of the above described gas turbine engines the flap is extended axially in the restricted position, relative to the unrestricted position.

In another example of any of the above described gas turbine engines the cavity includes a fore inlet configured to receive air from a fan stream, and defines a flowpath from the fore inlet to the vent.

In another example of any of the above described gas turbine engines the at least one flap is a plurality of flaps distributed circumferentially intermittent about the vent.

An exemplary method for suppressing an engine fire in a gas turbine engine includes initiating a fire suppression action by releasing a fire suppressant into a gas turbine engine core cavity and restricting an aft vent of the gas turbine engine core cavity.

In another example of the above described exemplary method for suppressing an engine fire in a gas turbine engine restricting the aft vent of the gas turbine engine comprises allowing the at least one flap to enter a normally restricted position by removing power from an actuator connected to the at least one flap.

In another example of any of the above described exemplary methods for suppressing an engine fire in a gas turbine engine restricting the aft vent of the gas turbine engine comprises allowing the at least one flap to enter a normally restricted position by mechanically disconnecting an actuator from the at least one flap.

In another example of any of the above described exemplary methods for suppressing an engine fire in a gas turbine engine restricting the aft vent of the gas turbine engine comprises causing the at least one flap to enter a restricted position from a normally unrestricted position by applying power to an actuator connected to the at least one flap.

In another example of any of the above described exemplary methods for suppressing an engine fire in a gas turbine engine restricting the at least one flap restricts airflow out of the core cavity, thereby decreasing a volume of fire suppressant required to lower a concentration of oxygen in the engine core cavity below an auto ignition level.

In one exemplary embodiment a gas turbine engine includes an engine core defining an axis and including a static structure surrounding a compressor, a combustor, and a turbine, the static structure at least partially defining a core cavity including a fore inlet configured to intercept airflow from a fan stream and including an aft vent configured to vent gas from the core cavity, the engine core defining an axis, wherein the vent includes at least one flap configured to be maintained in an unrestricted positon and in a restricted position via an actuator, and a controller configured to cause the at least one flap to transition to the restricted position in response to a fire suppression instruction.

In another example of the above described gas turbine engine the at least one flap is a normally restricted flap.

In another example of any of the above described gas turbine engines the at least one flap is a normally unrestricted flap.

In another example of any of the above described gas turbine engines the at least one flap is a plurality of flaps disposed circumferentially about the vent.

These and other features of the present invention can be best understood from the following specification and drawings, the following of which is a brief description.

DETAILED DESCRIPTION

Figure 1:
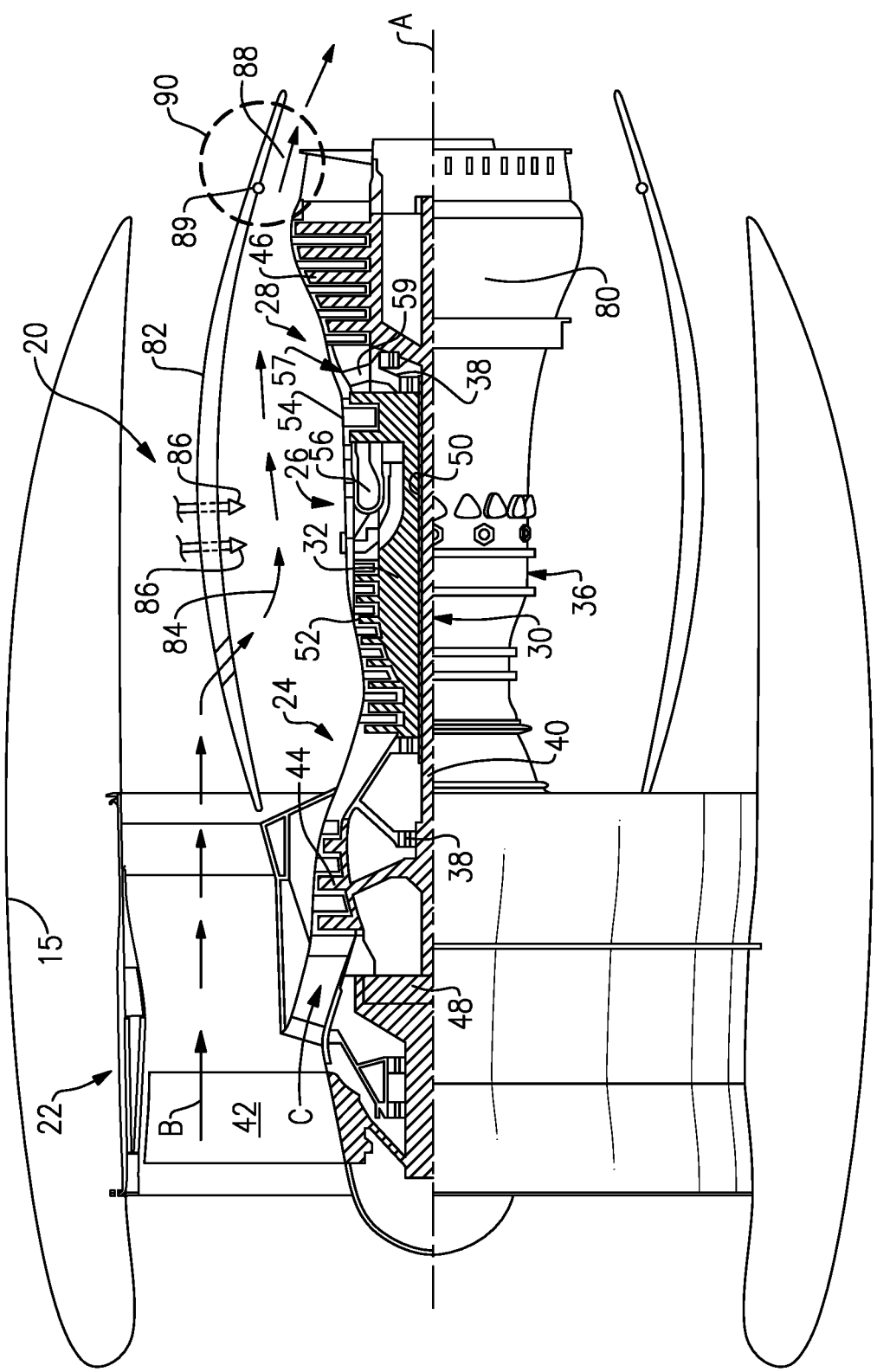
FIG. 1 illustrates a high level schematic view of an exemplary gas turbine engine including a fire suppression system FIG. 2 schematically illustrates a first example aft most vent portion of the gas turbine engine core compartment of FIG. 1.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures, direct drive engines, or any other turbine engine configuration.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ\ R)/(518.7^\circ\ R)]^{0.5}$. The "Low corrected fan tip speed" as disclosed herein according to one non-limiting embodiment is less than about 1150 ft/second (350.5 meters/second).

The compressor 24, combustor 26, and turbine 28 sections define an engine core 80 that is contained within a static structure 82. Defined between the static structure 82 and the engine core 80 are one or more cavities 84 that can be subjected to fire hazards during operation of the gas turbine engine 20. Each of the cavities 84 is connected to at least one fire suppressant supply in a corresponding wing or pylon of the aircraft via a nozzle 86. A fire detection system may be attached to the inner wall 82, attached to the engine case 80, or positioned in any other appropriate location. The nozzles 86 are configured to disperse the fire suppressant in the case of a detected fire within the cavity 84. At an aft end of the cavity 84, relative to an expected fluid flow through the cavity 84, is a vent 88 that allows air or other gasses within the cavity 84 to be expelled into an ambient atmosphere.

Current fire suppressant sources (e.g., fluid tanks, or bottles) are sized to overwhelm the vents 88, as well as all other openings within the inlet/ventilation system (e.g. fluid drains and the like). with a sufficient concentration of halon or another similar fire suppressant. Multiple suppressant sources are used and take up a significant volume within the structure of the wing.

In an exemplary embodiment, the majority of the ventilation through the compartment 84 comes from the fan airflow B and is expelled through the vent 88 at the aft end of the compartment 84 via an airflow D. Sufficient airflow is maintained through the compartment 84 in order to prevent buildup of flammable fluid vapors and maintain a concentration of flammable vapors significantly below an auto-ignition point. The vent 88 is designed to maximize thrust recovery of the flow at cruise conditions. Further, the vent 88 is configured to be constricted, or relaxed, via a pivot 89. Restricting the vent 88 further enhances the ability of the fire suppressant to reduce the concentration of oxygen within the cavity 84.

When a fire is detected within the cavity 84, an operator (such as a pilot) initiates a fire extinguishing system and pressurized gas within the fire suppressant source is released into the cavity 84 through the nozzles 86. The volume of suppressant in a given fire suppressant source overwhelms the existing incoming and exhausting air ventilation flows and maintains a sufficiently low concentration of oxygen for a long enough period of time to extinguish the fire. Absent a restricting vent 88, the fire suppressant is carried out of the compartment 84, along with the incoming ventilation air, as the suppressant is being inserted, and the volume of fire suppressant that must be inserted to affect an oxygen concentration is substantially large.

In order to increase the concentration of suppressant in the core compartment 84 and thus reduce the amount of suppressant needed for suppressing a fire, the vent 88 includes a constricting vent door configured to be actuated by the actuator 89. The actuator 89 is controlled by the same control system as the fire suppressant tanks, and constricts the vent 88 upon activation. In some examples, the activation of the actuator 89 can remove power from the actuator 89 allowing the vent 88 to automatically constrict. This configuration is referred to as a normally restricted vent, as the vent 88 is restricted absent an input of power. In another configuration, activation of the fire suppressant system, can simultaneously cause power to be provided to the actuator 89, thereby activating the actuator and restricting the vent 88. This configuration is referred to as a normally unrestricted vent, as the vent 88 is unrestricted absent an input of power.

Figure 2:
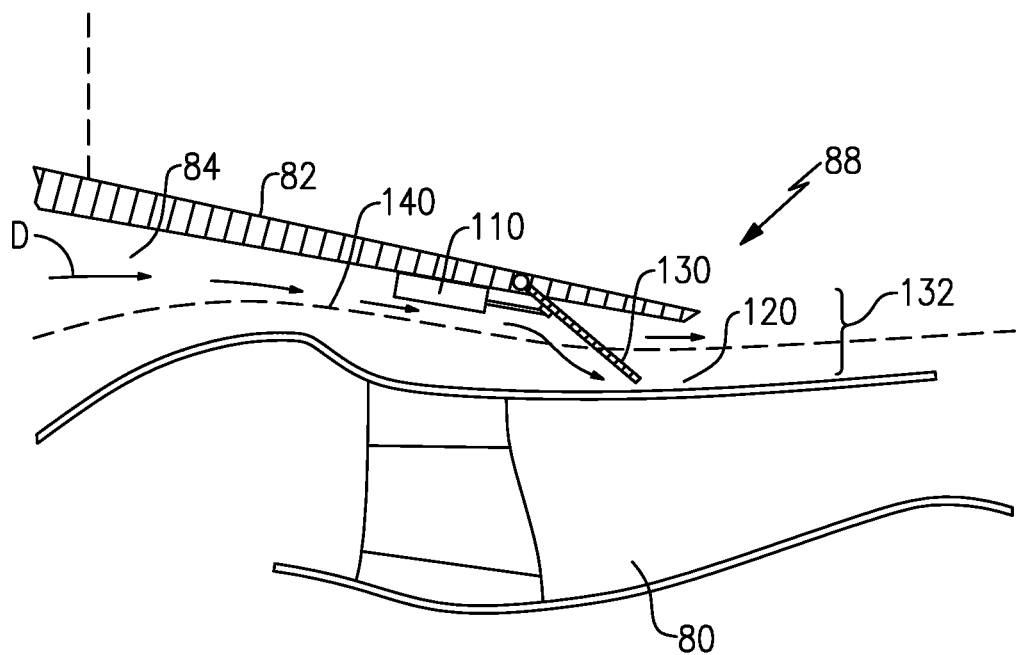

With continued reference to FIG. 1, FIG. 2 schematically illustrates an exemplary vent 88 including an actuator 110 configured to restrict and unrestrict a vent opening 120 via the actuation of a flap 130. While in an unrestricted position, the flap 130 is maintained flush, or approximately flush, with the nozzle portion 132 of the static structure 82. While in restricted position (i.e. when a fire suppression action is occurring), the flap 130 is pivoted closer to the engine core 80 by the actuator 130, thereby restricting the volume of fluid that can pass through the vent 88. The actuator 110 can be any know actuator type, and is not limited to the illustrated linear actuator. Further, in an alternative configuration, the flap 130 extends along the axis defined by the engine, rather than pivoting radially inward. In the alternative embodiment, the extension along the axis narrows the vent 88 opening 120, and a similar restriction occurs.

Figure 3:
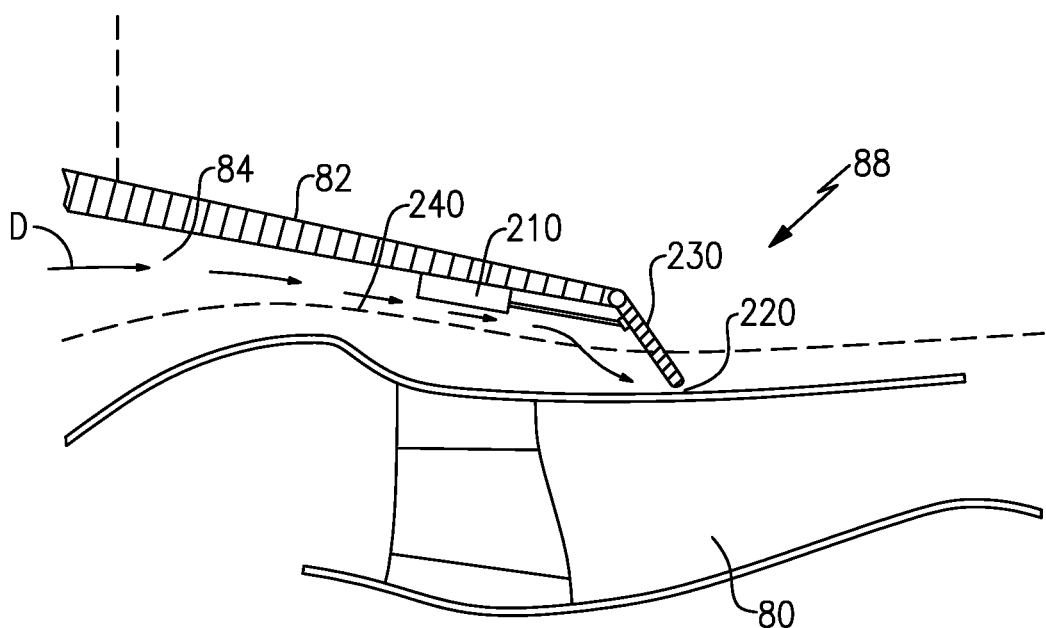
FIG. 3 schematically illustrates a second example aft most vent portion of the gas turbine engine core compartment of FIG. 1.
Figure 4:
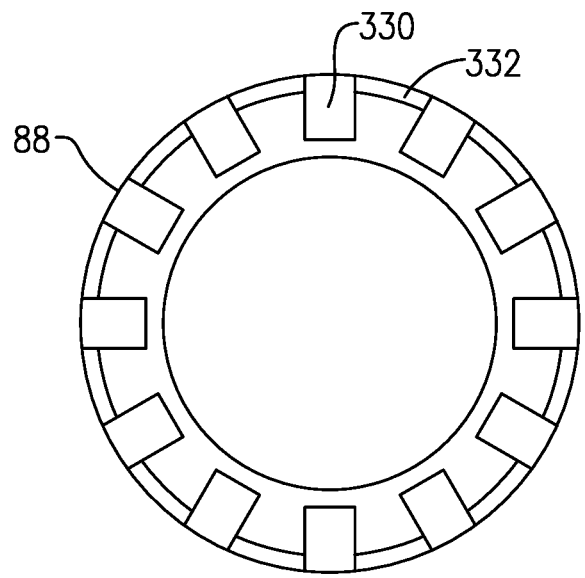
FIG. 4 schematically illustrates a rear view of the aft most vent portion of FIG. 3.
Figure 5:
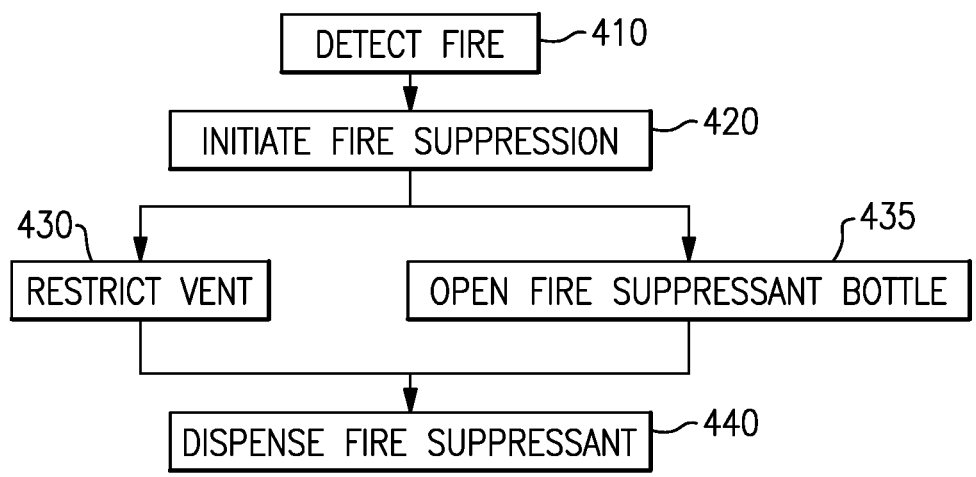
FIG. 5 illustrates a control process for activating the fire suppression system of FIGS. 1-4.

With continued reference to FIGS. 1 and 2, FIG. 3 schematically illustrates another example vent 88 including an actuator 210 configured to actuate a flap 230 of the static structure 82, thereby restricting the opening 220. Unlike the example of FIG. 2, the flap 230 of FIG. 3 is the end portion of the static structure 82, and is connected to a remaining portion of the static structure 82 via a hinge, or similar attachment. During operation of the fire suppression action, the flap 230 is pivoted radially inward, and restricts the vent 88 in the same manner as the example of FIG. 2.

With reference now to both FIGS. 2 and 3, in both examples, the restricted state of the flap 130, 230 does not entirely seal the compartment 84 and a gas flow 140, 240 is allowed to continue to pass through the compartment 84 and out the vent 88, even while restricted. In some limited alternative examples, such as an intermittent flap construction described below, the flap 130, 230 can be brought into contact with the engine core 80, without sealing the vent 88. In yet further examples, a construction is used where the restricted state of the flap 130, 230 seals the opening 120, 220.

With continued reference to FIGS. 1-3, FIG. 4 schematically illustrates an aft view of the vent 88 including multiple flaps 330 in a restricted state and multiple flaps 332 in an unrestricted state. The circumferentially alternating state is referred to as being circumferentially intermittent. While illustrated as alternating restricted and unrestricted flaps 330, 332, it is appreciated that the circumferential intermittence can be achieved with any intermittent pattern, and alternating every other flap 330, 332 is not required. By way of example, every third flap could restrict, every third flap could be left unrestricted, or any other similar intermittent configuration could be used.

With continued reference to FIGS. 1-4, FIG. 5 schematically illustrates a control sequence for suppressing a fire within the cavity 84. Initially a fire is detected in a "Detect Fire" step 410. Once detected, onboard systems notify the pilot and/or other operators of the aircraft of the fire, and the pilot or other operator initiates fire suppression in an "Initiate Fire Suppression" step 420.

Once the fire suppression is initiated, the vent 88 is restricted in a "Restrict Vent" step 430 and at least one bottle of the fire suppressant is opened to be released into the cavity 84 in an "Open Fire Suppressant Bottle" step 435. Both of these steps 430, 435 occur simultaneously, or approximately simultaneously in order to ensure that the vent 88 is properly restricted when the initial rush of fire suppressant gas enters the cavity 84. In alternative examples, step 430 may be sequenced ahead of 435 if timing of the actuation is desirable to achieve an optimum outcome.

In some examples, such as the normally restricted flaps 130, 230, restricting the vent occurs by removing power from the actuator 89, or mechanically disconnecting the actuator 89 entirely. This, in turn, allows the flaps 130, 230 to enter their normal, or resting, state. In alternative examples, such as the normally unrestricted flaps 130, 230, restricting the vent 88 occurs by applying power to the actuator 89, thereby causing the flap 130, 230 to become restricted.

Once the flaps 130, 230 have entered the restricted position, the fire suppressant is dispersed in a "Disperse Fire Suppressant" step 440. The fire suppressant is dispersed until the source (e.g. a fire suppressant canister) is emptied. By utilizing the restricting flaps 130, 230 at the vent 88, the size of the fire suppressant source can be reduced relative to existing systems, thereby allowing for more fire suppressant sources to be incorporated or for a reduction in the weight of the aircraft. Alternatively a higher likelihood of extinguishing the fire may occur by creating a higher concentration of the noble gas in the core compartment for a longer period of time.

While illustrated as two distinct embodiments, it is appreciated that the flaps 130, 230 of FIGS. 2 and 3 can be utilized in conjunction with each other in a single embodiment. It is also appreciated that the flaps of 130, 230 could be configured to be mounted to the core engine and act radially outward to close vent 88. The combined embodiment can be achieved by one of skill in the art using any conventional modification to the disclosed systems.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   an engine core including a compressor, a combustor fluidly connected to the compressor, and a turbine fluidly connected to the combustor, the engine core defining an axis;
   a core nacelle disposed radially outward of the engine core;
   a cavity disposed between an inner surface of the core nacelle and an outer surface of the engine core, the cavity including a vent disposed at an aft end;
   wherein the vent includes at least one flap configured to be maintained in an unrestricted position and in a normally restricted position;
   a powered actuator configured to control the position of the at least one flap; and
   a controller configured to mechanically disconnect the actuator from a power supply to the at least one flap in response to a fire suppression action.

2. The gas turbine engine of claim 1, wherein the controller is configured to remove power from the actuator in response to a fire suppression action.

3. The gas turbine engine of claim 1, wherein the flap is pivoted radially inward in the restricted position, relative to the unrestricted position.

4. The gas turbine engine of claim 1, wherein the cavity includes a fore inlet configured to receive air from a fan stream, and defines a flowpath from the fore inlet to the vent.

5. The gas turbine engine of claim 1, wherein the at least one flap is a plurality of flaps distributed circumferentially intermittent about the vent.

6. The gas turbine engine of claim 5, wherein the plurality of flaps includes a first set of flaps and a second set of flaps, the first set of flaps being unrestricted and the second set of flaps being restricted while the vent is in a restricted state.

7. The gas turbine engine of claim 6, wherein the plurality of flaps circumferentially alternates between the first set of flaps and the second set of flaps.

8. The gas turbine engine of claim 6, wherein every third flap in the plurality of flaps is in the first set of flaps.

9. The gas turbine engine of claim 1, wherein the restricted position allows airflow through the vent.

10. A method for suppressing an engine fire in a gas turbine engine comprising:
    initiating a fire suppression action by releasing a fire suppressant into a gas turbine engine core cavity and restricting an aft vent of the gas turbine engine core cavity, wherein restricting the aft vent does not entirely seal the aft vent, and wherein restricting the aft vent includes actuating a powered actuator, and wherein restricting the aft vent of the gas turbine engine comprises allowing at least one flap to enter a normally restricted position by mechanically disconnecting the powered actuator from the at least one flap.

11. The method of claim 10, wherein restricting the aft vent of the gas turbine engine comprises allowing the at least one flap to enter the normally restricted position by removing power from the powered actuator connected to the at least one flap.

12. The method of claim 10, wherein restricting the aft vent restricts airflow out of the core cavity, thereby decreasing a volume of the fire suppressant required to lower a concentration of oxygen in the engine core cavity below an auto ignition level.

13. A gas turbine engine comprising:
    an engine core defining an axis and including a static structure surrounding a compressor, a combustor, and a turbine, the static structure at least partially defining a core cavity including a fore inlet configured to intercept airflow from a fan stream and including an aft vent configured to vent gas from the core cavity;
    wherein the vent includes at least one flap configured to be maintained in an unrestricted position and in a normally restricted position via a powered actuator, wherein the restricted position does not entirely seal the vent; and
    a controller configured to cause the at least one flap to transition to the restricted position in response to a fire suppression instruction by mechanically disconnecting the actuator from a power supply.

14. The gas turbine engine of claim 13, wherein the at least one flap is a plurality of flaps disposed circumferentially about the vent.

* * * * *